(12) United States Patent
Kobayashi et al.

(10) Patent No.: US 7,672,033 B2
(45) Date of Patent: Mar. 2, 2010

(54) LIGHT MODULATING APPARATUS

(75) Inventors: Toshiaki Kobayashi, Tokyo (JP); Kenji Uchida, Tokyo (JP); Akira Toyama, Tokyo (JP); Katsuya Ikezawa, Tokyo (JP); Akira Miura, Tokyo (JP); Yasukazu Akasaka, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 285 days.

(21) Appl. No.: 11/700,813

(22) Filed: Feb. 1, 2007

(65) Prior Publication Data
US 2007/0177252 A1   Aug. 2, 2007

(30) Foreign Application Priority Data
Feb. 2, 2006   (JP)   .............................. 2006-025201

(51) Int. Cl.
*G02B 26/00*   (2006.01)
(52) U.S. Cl. ....................................... 359/238; 359/239
(58) Field of Classification Search .................. 359/238
See application file for complete search history.

(56) References Cited

U.S. PATENT DOCUMENTS

| | | | |
|---|---|---|---|
| 4,306,142 A | | 12/1981 | Watanabe et al. |
| 5,629,792 A | * | 5/1997 | Masaki .......................... 359/245 |
| 5,953,466 A | * | 9/1999 | Kubota et al. ................... 385/2 |
| 6,317,247 B1 | | 11/2001 | Yang et al. |
| 6,587,249 B2 | * | 7/2003 | Henry .......................... 359/245 |
| 6,879,422 B2 | * | 4/2005 | Notargiacomo et al. ...... 359/245 |
| 7,133,610 B1 | * | 11/2006 | Shimura et al. ............... 398/15 |
| 2002/0001116 A1 | * | 1/2002 | Kajiya et al. ................. 359/187 |
| 2006/0263098 A1 | * | 11/2006 | Akiyama et al. ............. 398/188 |

FOREIGN PATENT DOCUMENTS

| | | |
|---|---|---|
| EP | 0859263 A2 | 8/1998 |
| JP | 2642499 B2 | 5/1997 |
| JP | 3398929 B2 | 2/2003 |
| WO | WO 0148956 A1 | 7/2001 |

OTHER PUBLICATIONS

Swartz R G et al: "Electronics for High Speed, Burst Mode Optical Communications" International Journal of High Speed Electronics, World Scientific, London, GB, vol. 1, No. 3/4, 1996, pp. 223-243.

* cited by examiner

*Primary Examiner*—Jessica T Stultz
(74) *Attorney, Agent, or Firm*—Sughrue Mion, PLLC (57) ABSTRACT

In a light modulating apparatus of an external modulating type which is used in an optical communication system, there are provided an LN modulator, a light branching circuit, a photoelectric converter, a bias control circuit, a driver for an LN modulator which serves to drive the LN modulator in response to an input electric signal, a capacitor for cutting off DC and low frequency components of the input electric signal, a low frequency component compensating circuit for compensating the DC and low frequency components of the input electric signal, and an adding circuit for adding an output of the bias control circuit and that of the low frequency component compensating circuit and generating a bias control signal of the LN modulator.

12 Claims, 5 Drawing Sheets

LIGHT MODULATING APPARATUS

This application claims priority to Japanese Patent Application No. 2006-025201, filed Feb. 2, 2006, in the Japanese Patent Office. The priority application is incorporated by reference in its entirety.

TECHNICAL FIELD

The present disclosure relates to a light modulating apparatus of an external modulating type which is used in an optical communication system and more particularly to a light modulating apparatus capable of carrying out a light modulation over a burst signal at a high speed in a broadband.

RELATED ART

In recent years, there has been demanded a light modulating apparatus capable of stably outputting an output light signal (a light pulse) having a high frequency with the progress of an optical communication system. For example, there has been practically utilized a light modulating apparatus comprising an external modulator such as an EA (Electro Absorption) modulator (hereinafter referred to as an EA modulator) or an LN (Lithium Niobate) modulator (hereinafter referred to as an LN modulator) using, in a substrate, a material having an electro-optical effect (pockels effect) of lithium niobate ($LiNbO_3$), etc.

The related-art documents related to the related-art light modulating apparatus are as follows.

[Patent Document 1] Japanese Patent No. 2642499
[Patent Document 2] Japanese Patent No. 3398929

Figure 6:
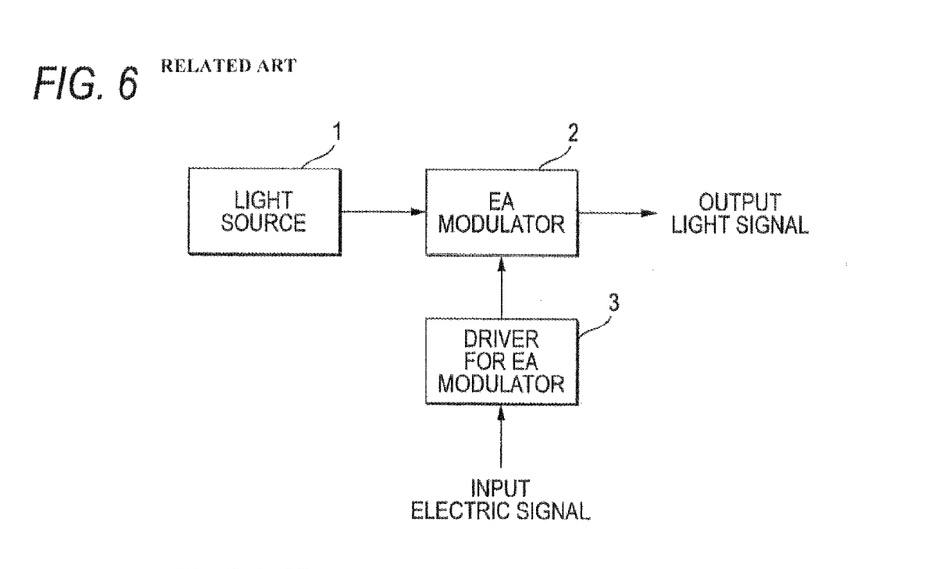
FIG. 6 is a block diagram showing a structure according to an example of a related-art light modulating apparatus.

FIG. 6 is a block diagram showing a structure according to an example of the related-art light modulating apparatus. In FIG. 6, 1 denotes a light source for always outputting a light having a constant wavelength (for example, 1550 nm), 2 denotes an EA modulator for modulating and outputting a light incident from the light source 1, and 3 denotes a driver for the EA modulator which serves to drive the EA modulator 2 corresponding to a logic level of an input electric signal sent from an outside.

An output terminal of the light source 1 is connected to an input terminal of the EA modulator 2, and an output terminal of the driver 3 for the EA modulator is connected to a modulating input signal terminal of the EA modulator 2. An input electric signal is input to an input terminal of the driver 3 for the EA modulator and an output light signal is output from an output terminal of the EA modulator 2.

Description will be given to an operation according to the related-art example shown in FIG. 6. The EA modulator 2 is of an electric field absorption type for carrying out the absorption or passage of a light in response to a modulating input signal input from the driver 3 for the EA modulator. In the case in which the input electric signal input from the outside has a low level, the driver 3 for the EA modulator outputs, to the EA modulator 2, the modulating input signal for absorbing the light incident from the light source 1, thereby bringing the output light signal output from the EA modulator 2 into an OFF state.

In the case in which the input electric signal input from the outside has a high level, moreover, the driver 3 for the EA modulator outputs, to the EA modulator 2, the modulating input signal for causing the light incident from the light source 1 to pass, thereby bringing the output light signal output from the EA modulator 2 into an ON state.

As a result, the driver 3 for the EA modulator drives the EA modulator 2 so that the light input to the EA modulator 2 is modulated and the output light signal output from the EA modulator 2 can be brought into the OFF or ON state corresponding to the logic level of the input electric signal input to the driver 3 for the EA modulator.

Figure 7:
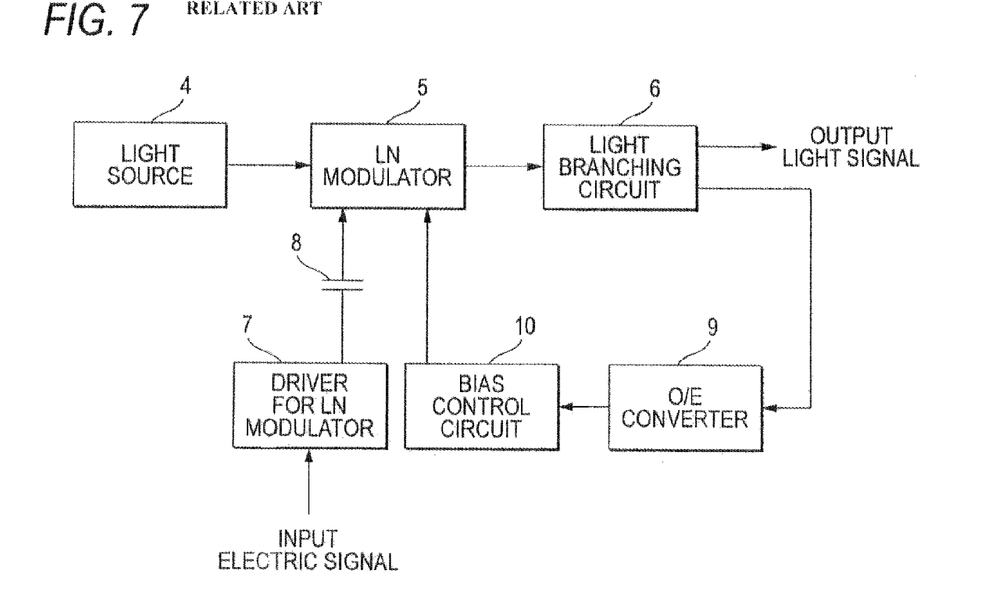
FIG. 7 is a block diagram showing a structure according to another example of the related-art light modulating apparatus.

FIG. 7 is a block diagram showing a structure according to another example of the related-art light modulating apparatus. In FIG. 7, 4 denotes a light source for always outputting a light having a constant wavelength (for example, 1550 nm), 5 denotes an LN modulator for modulating and outputting a light incident from the light source 4, 6 denotes a light branching circuit for branching an output light signal output from the LN modulator 5, 7 denotes a driver for the LN modulator which serves to drive the LN modulator 5 corresponding to a logic level of an input electric signal sent from an outside, 8 denotes a capacitor for cutting DC and low frequency components of a modulating input signal output from the driver 7 for the LN modulator, 9 denotes an OE (Optical/Electrical) converter (a photoelectric converter) for converting the light signal branched by the light branching circuit 6 into an electric signal, and 10 denotes a bias control circuit for adjusting a bias point of the LN modulator 5 based on an output signal of the o/E converter 9.

An output terminal of the light source 4 is connected to an input terminal of the LN modulator 5 and an output terminal of the LN modulator 5 is connected to an input terminal of the light branching circuit 6. One of outputs of the light branching circuit 6 is sent as an output light signal and the other output terminal of the light branching circuit 6 is connected to an input terminal of the O/E converter 9.

Moreover, an output terminal of the O/E converter 9 is connected to an input terminal of the bias control circuit 10 and an output terminal of the bias control circuit 10 is connected to a bias control signal input terminal of the LN modulator 5. One of ends of the capacitor 8 is connected to a modulating input signal terminal of the LN modulator 5 and the other end of the capacitor 8 is connected to an output terminal of the driver 7 for the LN modulator. Furthermore, an input electric signal is connected to an input terminal of the driver 7 for the LN modulator.

Description will be given to an operation according to the related-art example shown in FIG. 7. The LN modulator 5 is of a Mach-Zehnder type for branching the light incident from the light source 4 into two parts in an inner part and changing a phase of a light in response to the modulating input signal input from the driver 7 for the LN modulator, and then synthesizing waves into one light again and carrying out an output.

In the case in which the input electric signal input from the outside has a low level, the driver 7 for the LN modulator outputs, to the LN modulator 5, the modulating input signal for changing phases of the two lights branched in the LN modulator 5 so as to be different from each other by "π" and synthesizes the two lights in opposite phases, thereby bringing the output light signal into an OFF state.

In the case in which the input electric signal input from the outside has a high level, the driver 7 for the LN modulator outputs, to the LN modulator 5, the modulating input signal for changing the phases of the two lights branched in the LN modulator 5 to be coincident with each other and synthesizes the two lights in the same phase, thereby bringing the output light signal into an ON state.

The bias control circuit 10 adjusts a DC bias point of the LN modulator 5 in such a manner that a phase difference between two paths in the LN modulator 5 is regulated to freely turn OFF or ON the output light signal. The DC bias point drifts depending on a temperature and aging. For this reason, it is necessary to branch the output light signal of the LN modulator 5 through the light branching circuit 6 and to always carry out the adjustment through the bias control circuit 10 by using the output light signals thus branched.

Moreover, an NRZ (Non Return to Zero) signal or an RZ (Return to Zero) signal which is usually generated continuously and has an almost constant mark ratio (an appearance ratio of a high level to a low level) is used for the input electric signal to be sent to the LN modulator 5. Furthermore, there is an advantage that a DC bias value in the driver 7 for the LN modulator can be set optionally. In general, therefore, the capacitor 8 for cutting DC and low frequency components is used at the input/output of the driver 7 for the LN modulator or in the driver 7 for the LN modulator in many cases.

As a result, the driver 7 for the LN modulator drives the LN modulator 5 corresponding to the logic level of the input electric signal input to the driver 7 for the LN modulator so that the light input to the LN modulator 5 can be modulated and the output light signal output from the LN modulator 5 can be turned OFF or ON. Moreover, the output light signal output from the LN modulator 5 is branched through the light branching circuit 6 and the branched light signal is converted into the electric signal by the O/E converter 9, and the DC bias point is adjusted in the bias control circuit 10 so that the phase difference between the two paths in the LN modulator 5 can be controlled accurately. Consequently, it is possible to enhance a grade of a light waveform of the output light signal.

In the related-art example shown in FIG. 6, however, the EA modulator is used. For this reason, there is a problem in that a quenching ratio is low. On the other hand, in the related-art example shown in FIG. 7, the LN modulator is used. As compared with the light modulating apparatus using the EA modulator shown in FIG. 6, therefore, the example is excellent in the quenching ratio.

In the case in which the light modulating apparatus is demanded to be operated in a burst mode because of a system and a further increase in a speed, troubles are made in the related-art example shown in FIG. 7. In the burst mode in which a burst can be generated in an optional timing, a frequency component in a broadband from "0Hz" to an almost bit rate of the burst can be contained in the signal.

In the related-art example shown in FIG. 7, however, the capacitor for cutting the DC and low frequency components is provided. For this reason, the DC and low frequency components in an original burst signal are cut off by the capacitor. As a result, a normal light modulating signal cannot be obtained, resulting in a light modulating output corresponding to the burst signal lacking in the DC and low frequency components.

With a structure in which the capacitor for cutting the DC and low frequency components is eliminated and a connection is carried out on a DC basis from the input electric signal to the LN modulator through the driver for the LN modulator, moreover, it is hard to implement the driver for the LN modulator corresponding to a burst signal at a high speed in a broadband.

In general, an approximately "$3V_{p\text{-}p}$" is required for an amplitude of the modulating input signal to be input to the LN modulator. In the case in which a high speed signal in which a bit rate of the burst signal for driving the LN modulator is in order of several tens Gbps is supposed, furthermore, a demand for generating a signal of approximately "$3V_{p\text{-}p}$" in a broadband in order of several tens Gbps from a direct current is given to the driver for the LN modulator so that an implementation thereof is very hard.

As described above, there is a problem in that it is hard to implement the light modulating apparatus capable of carrying out a light modulation over a burst signal at a high speed in a broadband.

SUMMARY

Embodiments of the present invention provide a light modulating apparatus capable of obtaining a light modulating output which is excellent in a quenching ratio by using an LN modulator in place of an EA modulator and carrying out a light modulation over a burst signal at a high speed in a broadband in an optical communication system to be operated in a burst mode.

In order to achieve the object, a first aspect of the invention is directed to a light modulating apparatus of an external modulating type which is used in an optical communication system, comprising an LN modulator for modulating a light which is incident from a light source and outputting an output light signal, a light branching circuit for branching the output light signal, a photoelectric converter for converting an output signal of the light branching circuit into an electric signal, a bias control circuit for generating a signal based on an output signal of the photoelectric converter, a driver for an LN modulator which serves to drive the LN modulator in response to an input electric signal, a capacitor connected to an input terminal or output terminal of the driver for an LN modulator and serving to cut off DC and low frequency components of the input electric signal, a low frequency component compensating circuit for compensating the DC and low frequency components of the input electric signal which are lost by the capacitor, and an adding circuit for adding an output of the bias control circuit and that of the low frequency component compensating circuit and generating a bias control signal for adjusting a bias point of the LN modulator.

A second aspect of the invention is directed to a light modulating apparatus of an external modulating type which is used in an optical communication system, comprising an LN modulator for modulating a light which is incident from a light source and outputting an output light signal, and converting the output light signal into an electric signal by a built-in photoelectric converter, a bias control circuit for generating a signal based on the electric signal, a driver for an LN modulator which serves to drive the LN modulator in response to an input electric signal, a capacitor connected to an input terminal or output terminal of the driver for an LN modulator and serving to cut off DC and low frequency components of the input electric signal, a low frequency component compensating circuit for compensating the DC and low frequency components of the input electric signal which are lost by the capacitor, and an adding circuit for adding an output of the bias control circuit and that of the low frequency component compensating circuit and generating a bias control signal for adjusting a bias point of the LN modulator.

A third aspect of the invention is directed to the light modulating apparatus according to the first or second aspect of the invention, wherein the LN modulator has the adding circuit provided therein.

A fourth aspect of the invention is directed to a light modulating apparatus of an external modulating type which is used in an optical communication system, comprising an LN modulator for modulating a light which is incident from a light source and outputting an output light signal, a light branching circuit for branching the output light signal, a photoelectric converter for converting an output signal of the light branching circuit into an electric signal, a bias control circuit for generating a bias control signal for adjusting a bias point of the LN modulator based on an output signal of the photoelectric converter, a driver for an LN modulator which serves to drive the LN modulator in response to an input electric signal, a capacitor connected to an input terminal or output terminal of the driver for an LN modulator and serving to cut off DC and low frequency components of the input electric signal, a low frequency component compensating circuit for compensating the DC and low frequency components of the input electric signal which are lost by the capacitor, and an adding circuit for adding an output of the driver for an LN modulator and that of the low frequency component compensating circuit and generating a modulating input signal of the LN modulator.

A fifth aspect of the invention is directed to a light modulating apparatus of an external modulating type which is used in an optical communication system, comprising an LN modulator for modulating a light which is incident from a light source and outputting an output light signal, and converting the output light signal into an electric signal by a built-in photoelectric converter, a bias control circuit for generating a bias control signal for adjusting a bias point of the LN modulator based on the electric signal, a driver for an LN modulator which serves to drive the LN modulator in response to an input electric signal, a capacitor connected to an input terminal or output terminal of the driver for an LN modulator and serving to cut off DC and low frequency components of the input electric signal, a low frequency component compensating circuit for compensating the DC and low frequency components of the input electric signal which are lost by the capacitor, and an adding circuit for adding an output of the driver for an LN modulator and that of the low frequency component compensating circuit and generating a modulating input signal of the LN modulator.

A sixth aspect of the invention is directed to the light modulating apparatus according to any of the first to fifth aspects of the invention, wherein the capacitor is provided in the driver for an LN modulator.

According to the invention, the following advantages can be obtained.

According to the first, second, third and sixth aspects of the invention, the DC and low frequency components of the input electric signal input to the driver for an LN modulator are extracted and amplified by the low frequency component compensating circuit and the bias control of the LN modulator is carried out in response to the signal added to the output from the bias control circuit. Consequently, it is possible to compensate the DC and low frequency components of the input electric signal which are cut off by the capacitor. Thus, it is possible to implement a light modulating apparatus capable of carrying out a light modulation over a burst signal at a high speed in a broadband.

According to the fourth, fifth and sixth aspects of the invention, the DC and low frequency components of the input electric signal input to the driver for an LN modulator are extracted and amplified by the low frequency component compensating circuit and the LN modulator is driven in response to the signal added to the output from the driver for an LN modulator. Consequently, it is possible to compensate the DC and low frequency components of the input electric signal which are cut off by the capacitor. Thus, it is possible to implement a light modulating apparatus capable of carrying out a light modulation over a burst signal at a high speed in a broadband.

Other features and advantages may be apparent from the following detailed description, the accompanying drawings and the claims.

DETAILED DESCRIPTION

Figure 1:
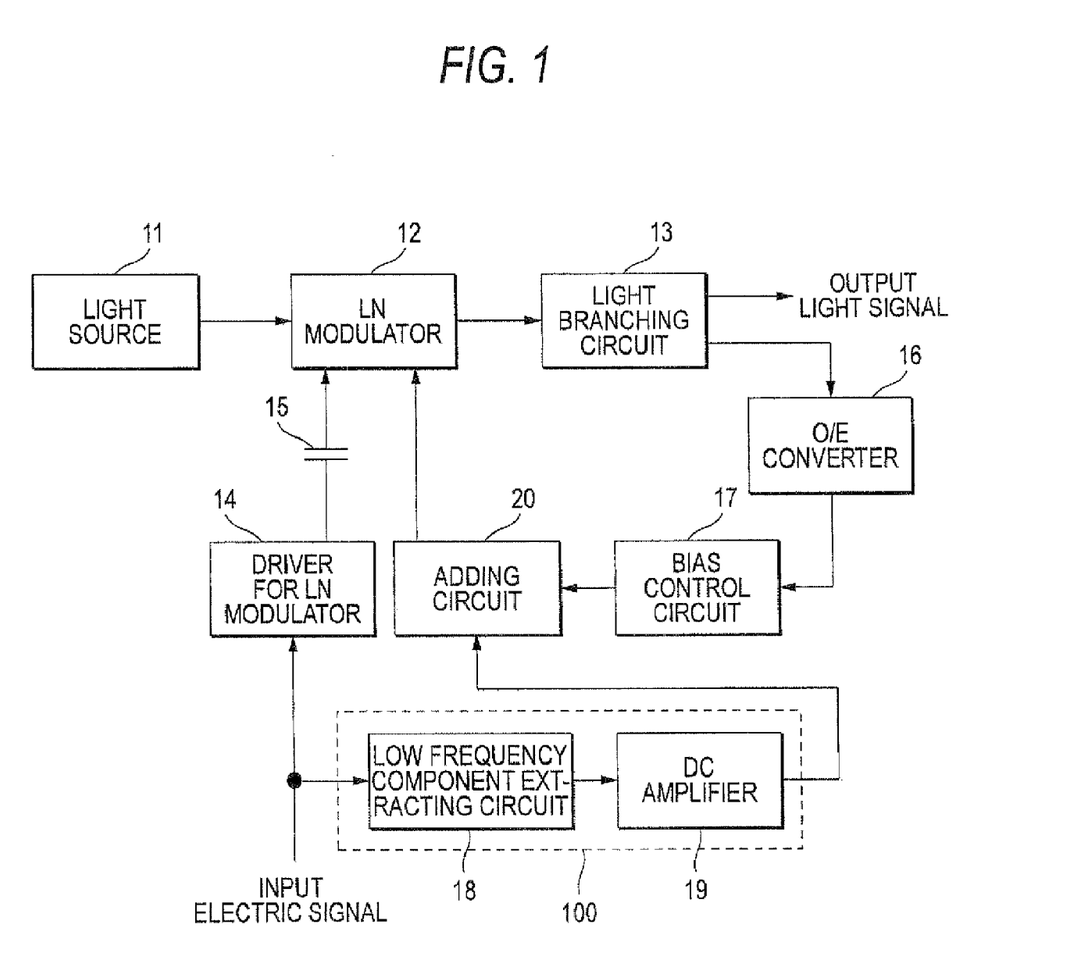
FIG. 1 is a block diagram showing a structure according to an example of a light modulating apparatus in accordance with the invention.

The invention will be described below in detail with reference to the drawings. FIG. 1 is a block diagram showing a structure according to an example of a light modulating apparatus in accordance with the invention. In FIG. 1, 11 denotes a light source for always outputting a light having a constant wavelength (for example, 1550 nm), 12 denotes an LN modulator for modulating and outputting a light which is incident from the light source 11, 13 denotes a light branching circuit for branching an output light signal which is output from the LN modulator 12, and 14 denotes a driver for an LN modulator which serves to drive the LN modulator 12 corresponding to a logic level of an input electric signal which is transmitted from an outside.

Moreover, 15 denotes a capacitor for cutting DC and low frequency components of a modulating input signal output from the driver 14 for an LN modulator, 16 denotes an O/E converter such as a photodiode which serves to convert, into an electric signal, a light signal branched by the light branching circuit 13, 17 denotes a bias control circuit for adjusting a bias point of the LN modulator 12 based on an output signal of the O/E converter 16, 18 denotes a low frequency component extracting circuit for extracting DC and low frequency components of an input electric signal, 19 denotes a DC amplifier for amplifying an output of the low frequency component extracting circuit 18, and 20 denotes an adding circuit for adding an output of the bias control circuit 17 and that of the DC amplifier 19.

Furthermore, the low frequency component extracting circuit 18 and the DC amplifier 19 constitute a low frequency component compensating circuit 100.

An output terminal of the light source 11 is connected to an input terminal of the LN modulator 12, and an output terminal of the LN modulator 12 is connected to an input terminal of the light branching circuit 13. One of outputs of the light branching circuit 13 is output as an output light signal and the other output terminal of the light branching circuit 13 is connected to an input terminal of the O/E converter 16.

Moreover, an output terminal of the O/E converter 16 is connected to an input terminal of the bias control circuit 17, and an output terminal of the bias control circuit 17 is connected to one of input terminals of the adding circuit 20. An output terminal of the adding circuit 20 is connected to a bias control signal input terminal of the LN modulator 12.

Furthermore, an output terminal of the driver 14 for an LN modulator is connected to one of ends of the capacitor 15, and the other end of the capacitor 15 is connected to a modulating input signal terminal of the LN modulator 12. An input electric signal is connected to an input terminal of the driver 14 for an LN modulator and an input terminal of the low frequency component extracting circuit 18, respectively. An output terminal of the low frequency component extracting circuit 18 is connected to an input terminal of the DC amplifier 19, and an output terminal of the DC amplifier 19 is connected to the other input terminal of the adding circuit 20.

Figure 2:
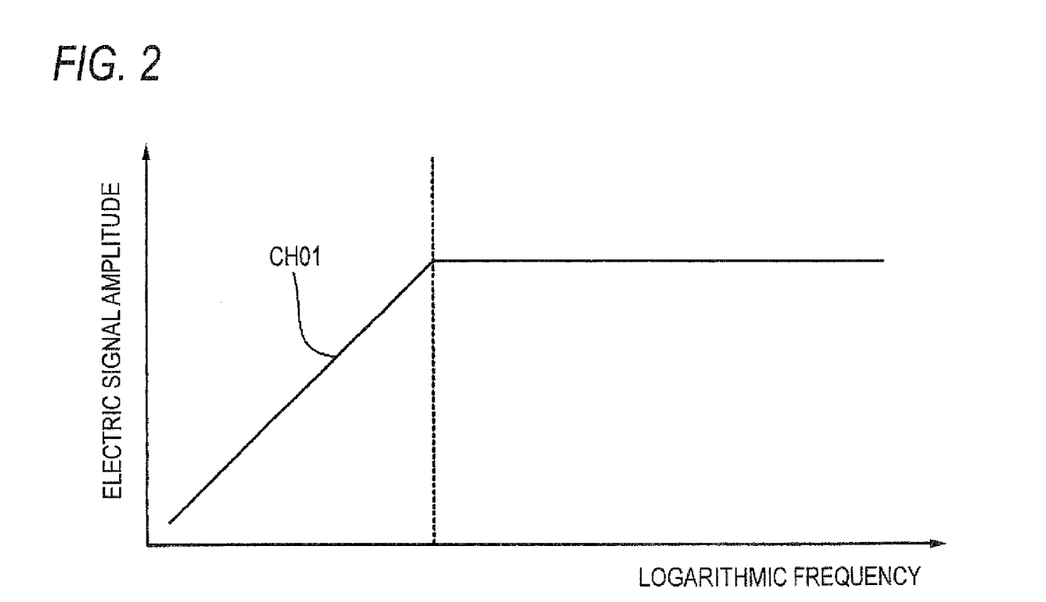
FIG. 2 is a characteristic chart showing a transmitting characteristic of a path from a driver for an LN modulator to the LN modulator.

An operation according to the example shown in FIG. 1 will be described with reference to FIGS. 2 and 3. FIG. 2 is a characteristic chart showing a transmitting characteristic of a path from the driver 14 for an LN modulator to the LN modulator 12 and FIG. 3 is a characteristic chart showing a transmitting characteristic of the low frequency component extracting circuit 18.

A basic operation is almost the same as that of the related-art example of FIG. 7 and is different therefrom in that the low frequency component extracting circuit 18, the DC amplifier 19 and the adding circuit 20 are provided additionally. The input electric signal is filtered based on a low frequency cutoff characteristic indicated as "CH01" in FIG. 2 by the capacitor 15 via the driver 14 for an LN modulator. For this reason, the DC and low frequency components lack.

Figure 3:
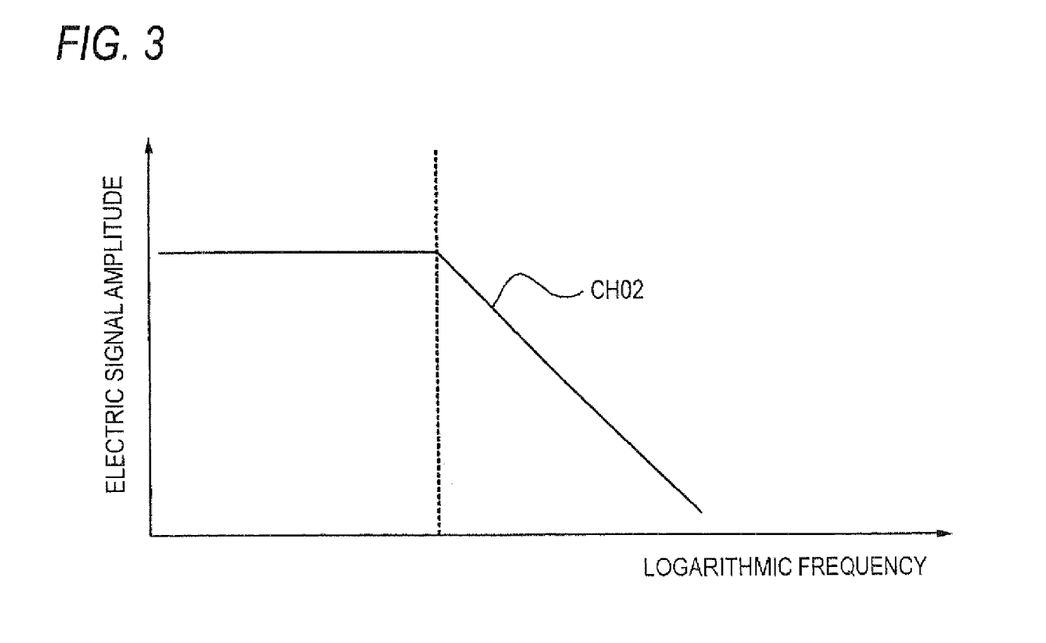
FIG. 3 is a characteristic chart showing a transmitting characteristic of a low frequency component extracting circuit.

On the other hand, the low frequency component extracting circuit 18 has a transmitting characteristic indicated as "CH02" in FIG. 3. Therefore, the DC and low frequency components of the input electric signal are extracted to cut off a high frequency component. A cutoff frequency of the transmitting characteristic is equal to a cutoff frequency of a low frequency cutoff characteristic indicated as "CH01" in FIG. 2. An output of the low frequency component extracting circuit 18 is amplified by the DC amplifier 19 and is added to an output of the bias control circuit 17 in the adding circuit 20. An output signal of the adding circuit 20 is input to the bias control signal input terminal of the LN modulator 12.

In the LN modulator 12, an input from the driver 14 for an LN modulator and an input from the adding circuit 20 are added in a light wave phase region. For this reason, the DC and low frequency components of the input electric signal cut off by the capacitor 15 are reflected. Therefore, it is possible to obtain an output light signal corresponding to the input electric signal to be input to the driver 14 for an LN modulator.

Description will be given to the details of a process for restoring the input electric signal in the light wave phase region in the LN modulator 12. The input electric signal is input to the LN modulator 12 via the driver 14 for an LN modulator and the capacitor 15, and a light wave phase difference expressed in Equation (1) is generated in the LN modulator 12. "Δφh" represents a light wave phase difference, "$V_{in\_h}$" represents a high frequency component of the input electric signal passing through the capacitor 15, "$K_{dr}$" represents a gain of the driver 14 for an LN modulator, "$K_{rf}$" represents a proportionality constant related to the modulating input signal of the LN modulator 12, and "$\theta_{rf}$" represents a phase offset.

$$\Delta\phi h = K_{rf} \cdot K_{dr} \cdot V_{in\_h} + \theta_{rf} \quad (1)$$

On the other hand, the input electric signal input to the LN modulator 12 via the low frequency component extracting circuit 18, the DC amplifier 19 and the adder 20 generates a light wave phase difference expressed in Equation (2) in the LN modulator 12. "Δφl" represents a light wave phase difference, "$V_{in\_l}$" represents DC and low frequency components of the input electric signal extracted by the low frequency component extracting circuit 18, "$K_{dc}$" represents a gain of the DC amplifier 19, "$K_{cont}$" represents a proportionality constant related to the bias control input signal of the LN modulator 12, and "$\theta_{dc}$" represents a phase offset.

$$\Delta\phi l = K_{dc} \cdot K_{cont} \cdot V_{in\_l} + \theta_{dc} \quad (2)$$

If the gain "$K_{dc}$" of the DC amplifier 19 is set to be "$(K_{rf} \cdot K_{dr}/K_{cont})$", the Equation (2) is expressed as Equation (3).

$$\Delta\phi l = K_{rf} \cdot K_{dr} \cdot V_{in\_l} + \theta_{dc} \quad (3)$$

Since the LN modulator 12 is driven by the driver 14 for an LN modulator and the DC amplifier 19, the light wave phase difference in the LN modulator 12 is obtained as a sum of the Equations (1) and (3) as expressed in Equation (4). "$V_{in}$" indicates an input electric signal and serves to mutually compensate frequency components of "$V_{in\_h}$" and "$V_{in\_l}$". Therefore, a relationship of "$V_{in} = V_{in\_h} + V_{in\_l}$" is set.

$$\Delta\phi h + \Delta\phi l = K_{rf} \cdot K_{dr} \cdot (V_{in\_h} + V_{in\_l}) + \theta_{rf} + \theta_{dc} \quad (4)$$
$$= K_{rf} \cdot K_{dr} \cdot V_{in} + \theta_{rf} + \theta_{dc}$$

A phase offset "$\theta_{rf} + \theta_{dc}$" in the Equation (4) is a fixed phase difference and is an amount which can be corrected by the bias control circuit 17. By disregarding the phase offset "$\theta_{rf} + \theta_{dc}$", accordingly, it is apparent that "Δφh+Δφl" to be a phase difference obtained by integrating a left side of the Equation (4) is equivalent to that the input electric signal directly drives the LN modulator 12 via the driver 14 for an LN modulator in a state in which the capacitor 15 is not provided, that is, a DC connecting state.

Referring to the proportionality constant related to the light wave phase difference conversion of the LN modulator 12, generally, a constant for a bias control input is smaller than a constant for a normal modulating input of the LN modulator 12 and "$K_{cont} < K_{rf}$" is obtained. Moreover, it is sufficient that the bias control input of the LN modulator 12 can correspond to a slow fluctuation in a DC bias of the LN modulator 12. Therefore, a band is not very broad in a normal case.

In order to implement the invention, a capacity of the capacitor 15 is to be selected in such a manner that a low frequency cutoff frequency of the capacitor 15 related to the driver 14 for an LN modulator is included in a band possessed by the bias control input of the LN modulator 12.

As a result, only the DC and low frequency components of the input electric signal input to the driver 14 for an LN modulator are extracted by the low frequency component extracting circuit 18 and are amplified by the DC amplifier 19, and the bias control of the LN modulator 12 is carried out in response to a signal added to an output from the bias control circuit 17 so that the DC and low frequency components of the input electric signal cut off by the capacitor 15 attached to the output of the driver 14 for an LN modulator can be compensated. Consequently, it is possible to implement a light modulating apparatus capable of carrying out a light modulation over a burst signal at a high speed in a broadband.

While the light branching circuit 13 and the O/E converter 16 which are externally provided are used in the example shown in FIG. 1, it is also possible to use an O/E converter for a monitor which is provided in an LN modulator. In this case, the light branching circuit 13 is not required and an electric signal output from the O/E converter for a monitor which is provided in the LN modulator 12 is directly input to the bias control circuit 17.

Although the low frequency component compensating circuit 100 is constituted by the low frequency component extracting circuit 18 and the DC amplifier 19 in the example shown in FIG. 1, the structure of the circuit is not restricted thereto but an error amplifier for amplifying an error of the output of the O/E converter and the input electric signal may be used to constitute the low frequency component compensating circuit, for example.

Figure 4:
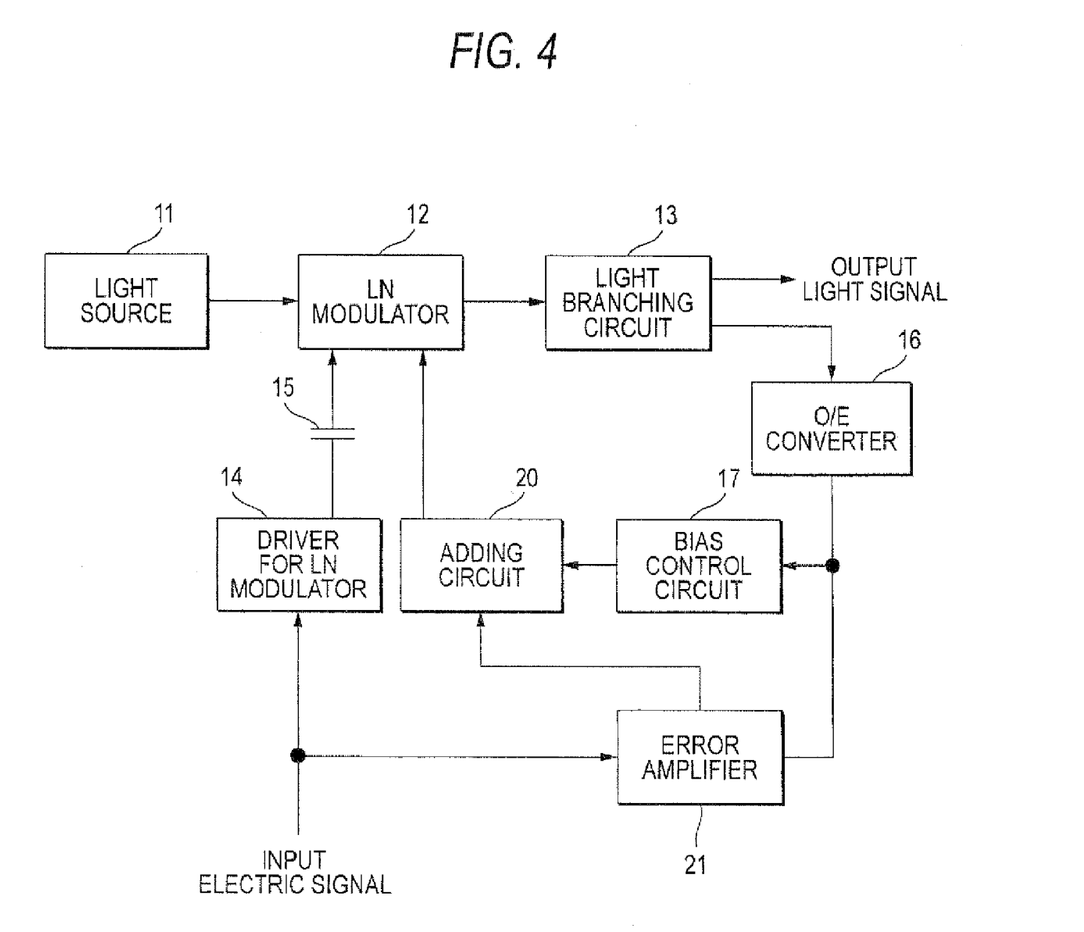
FIG. 4 is a block diagram showing a structure according to another example of the light modulating apparatus in accordance with the invention using an error amplifier.

An operation in this case will be described with reference to FIG. 4. FIG. 4 is a block diagram showing a structure according to another example of the light modulating apparatus in accordance with the invention using the error amplifier. In FIGS. 4, 11, 12, 13, 14, 15, 16, 17 and 20 are the same as those in FIGS. 1 and 21 denotes the error amplifier.

An input electric signal is connected to one of input terminals of the error amplifier 21 and an output terminal of an O/E converter 16 is connected to the other input terminal of the error amplifier 21. An output terminal of the error amplifier 21 is connected to one of input terminals of an adder 20. Since other connecting relationships are the same as those in the example shown in FIG. 1, description thereof will be omitted.

A basic operation is almost the same as that of the example shown in FIG. 1 and is different therefrom in that a compensation of DC and low frequency components is obtained by amplifying an error of the input electric signal and an output of the O/E converter 16 by the error amplifier 21.

As a result, the error of the input electric signal input to a driver 14 for an LN modulator and the output of the O/E converter 16 is amplified by the error amplifier 21 and a bias control of an LN modulator 12 is carried out in response to a signal added to an output from a bias control circuit 17 so that it is possible to compensate the DC and low frequency components of the input electric signal which are cut off by a capacitor 15 attached to an output of the driver 14 for an LN modulator. Consequently, it is possible to implement a light modulating apparatus capable of carrying out a light modulation over a burst signal at a high speed in a broadband.

In the example shown in FIG. 1, an output of a DC amplifier 19 and that of the bias control circuit 17 are added by the adding circuit 20 and are thus input to the LN modulator 12. However, in the case in which the LN modulator has two input terminals for a bias control and their potential difference is converted into a light wave phase difference in the LN modulator, it is also possible to employ a structure in which an output of a DC amplifier is connected to one of input terminals for the bias control of the LN modulator and an output of a bias control circuit is connected to the other input terminal.

Further, the DC and low frequency components of the input electric signal are applied as the bias control signal to the LN modulator 12 and the addition is carried out in the light wave phase region in the example shown in FIG. 1. However, it is not necessary to always carry out them but the addition may be performed in an electric signal region. More specifically, a gain of the DC amplifier 19 shown in FIG. 1 is adapted to that of the driver 14 for an LN modulator, and the output of the DC amplifier 19 is electrically added to that of the driver 14 for an LN modulator and a result of the addition is applied as a normal modulating input signal to the LN modulator 12.

Figure 5:
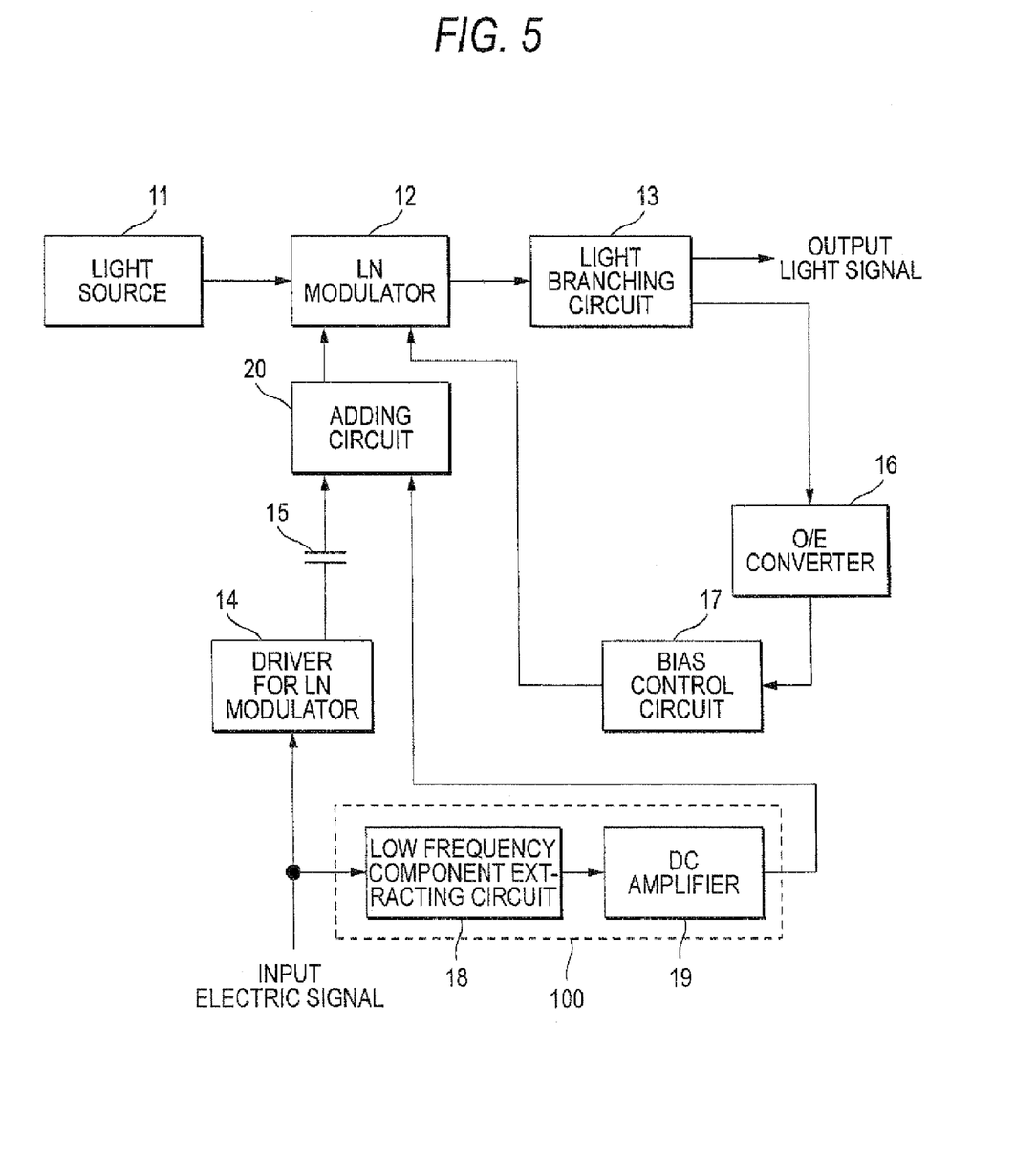
FIG. 5 is a block diagram showing a structure according to a further example of the light modulating apparatus in accordance with the invention.

An operation in this case will be described with reference to FIG. 5. FIG. 5 is a block diagram showing a structure according to a further example of the light modulating apparatus in accordance with the invention. In FIGS. 5, 11, 12, 13, 14, 15, 16, 17, 18, 19, 20 and 100 are the same as those in FIG. 1.

An output terminal of a light source 11 is connected to an input terminal of an LN modulator 12, and an output terminal of the LN modulator 12 is connected to an input terminal of a light branching circuit 13. One of outputs of the light branching circuit 13 is output as an output light signal and the other output terminal of the light branching circuit 13 is connected to an input terminal of an O/E converter 16. An output terminal of the O/E converter 16 is connected to an input terminal of a bias control circuit 17, and an output terminal of the bias control circuit 17 is connected to a bias control signal input terminal of the LN modulator 12.

Furthermore, an output terminal of a driver 14 for an LN modulator is connected to one of ends of a capacitor 15, and the other end of the capacitor 15 is connected to one of input terminals of an adding circuit 20. An input electric signal is connected to an input terminal of the driver 14 for an LN modulator and an input terminal of a low frequency component extracting circuit 18, respectively. An output terminal of the low frequency component extracting circuit 18 is connected to an input terminal of a DC amplifier 19, and an output terminal of the DC amplifier 19 is connected to the other input terminal of the adding circuit 20. An output terminal of the adding circuit 20 is connected to a modulating input signal terminal of the LN modulator 12.

Description will be given to an operation according to the example shown in FIG. 5. An output light signal of the LN modulator 12 is branched in the light branching circuit 13 and the signal thus branched is converted from the light signal into an electric signal by the O/E converter 16. Based on the electric signal, the bias control circuit 17 adjusts a DC bias point of the LN modulator 12 by adjusting a phase difference between two paths in the LN modulator 12 to freely turn OFF or ON the output light signal. The operation for adjusting the bias point is the same as that in the related-art example shown in FIG. 7.

The driver 14 for an LN modulator inputs, to one of the input terminals of the adding circuit 20, a modulating input signal having DC and low frequency components cut by the capacitor 15. Moreover, the DC and low frequency components of the input electric signal are extracted by the low frequency component extracting circuit 18 and a signal amplified by the DC amplifier 19 is input to the other input terminal of the adding circuit 20.

The modulating input signal added by the adding circuit 20 is input to the modulating input signal terminal of the LN modulator 12. Therefore, it is possible to drive the LN modulator 12 in a state in which the DC and low frequency components of the input electric signal are compensated.

As a result, the DC and low frequency components of the input electric signal input to the driver 14 for an LN modulator are extracted by the low frequency component extracting circuit 18 and are amplified by the DC amplifier 19, and the LN modulator 12 is driven in response to a signal added to an output from the driver 14 for an LN modulator. Consequently, it is possible to compensate the DC and low frequency components of the input electric signal which is cut off by the capacitor 15. Thus, it is possible to implement a light modulating apparatus capable of carrying out a light modulation over a burst signal at a high speed in a broadband.

In the case in which the input electric signal has a low level in the example shown in FIG. 1, moreover, the output light signal is set into an OFF state. In the case in which the input electric signal has a high level, the output light signal is set into an ON state. It is also possible to set the output light signal into the ON state when the input electric signal has the low level and to set the output light signal into the OFF state when the input electric signal has the high level.

While the capacitor 15 is attached to the output terminal of the driver 14 for an LN modulator in the examples shown in FIGS. 1 and 5, moreover, it may be connected to the input terminal of the driver 14 for an LN modulator or may be provided in the driver 14 for an LN modulator.

What is claimed is:

1. A light modulating apparatus of an external modulating type which is used in an optical communication system, comprising:
    an LN modulator for modulating a light which is incident from a light source and outputting an output light signal;
    a light branching circuit for branching the output light signal;
    a photoelectric converter for converting an output signal of the light branching circuit into an electric signal;
    a bias control circuit for generating a signal based on the electric signal of the photoelectric converter;
    a driver for an LN modulator which serves to drive the LN modulator in response to an input electric signal;
    a capacitor connected to an input terminal or output terminal of the driver for an LN modulator and serving to cut off DC and low frequency components of the input electric signal;
    a low frequency component compensating circuit for compensating the DC and low frequency components of the input electric signal which are lost by the capacitor, wherein said low frequency component compensating circuit outputs DC and low frequency components; and
    an adding circuit for adding an output of the bias control circuit and an output of the low frequency component compensating circuit and generating a bias control signal for adjusting a bias point of the LN modulator.

2. The light modulating apparatus according to claim 1, wherein the LN modulator has the adding circuit provided therein.

3. The light modulating apparatus according to claim 1, wherein the capacitor is provided in the diver for an LN modulator.

4. The light modulating apparatus according to claim 1, wherein the low frequency compensating circuit comprises a DC amplifier for amplifying the DC and low frequency components of the input electric signal.

5. The light modulating apparatus according to claim 1, wherein the low frequency compensating circuit comprises a low frequency component extracting circuit that cuts off a high frequency component of the input electric signal and a cutoff frequency of the capacitor is equal to a cutoff frequency of the low frequency component extracting circuit.

6. The light modulating apparatus according to claim 1, wherein the input electric signal is a burst signal including a frequency component ranging from DC to almost a hit rate of the burst.

7. A light modulating apparatus of an external modulating type which is used in an optical communication system, comprising:
    an LN modulator for modulating a light which is incident from a light source and outputting an output light signal, and converting the output light signal into an electric signal by a built-in photoelectric converter;
    a bias control circuit for generating a signal based on the electric signal;
    a driver for an LN modulator which serves to drive the LN modulator in response to an input electric signal;
    a capacitor connected to an input terminal or output terminal of the driver for an LN modulator and serving to cut off DC and low frequency components of the input electric signal;
    a low frequency component compensating circuit for compensating the DC and low frequency components of the input electric signal which are lost by the capacitor, wherein said low frequency component compensating circuit outputs DC and low frequency components; and
    an adding circuit for adding an output of the bias control circuit and an output of the low frequency component compensating circuit and generating a bias control signal for adjusting a bias point of the LN modulator.

8. The light modulating apparatus according to claim 7, wherein the LN modulator has the adding circuit provided therein.

9. The light modulating apparatus according to claim 7, wherein the capacitor is provided in the driver for an LN modulator.

10. The light modulating apparatus according to claim 7, wherein the low frequency compensating circuit comprises a DC amplifier for amplifying the DC and low frequency components of the input electric signal.

11. The light modulating apparatus according to claim 7, wherein the low frequency compensating circuit comprises a low frequency component extracting circuit that cuts off a high frequency component of the input electric signal and a cutoff frequency of the capacitor is equal to a cutoff frequency of the low frequency component extracting circuit.

12. The light modulating apparatus according to claim 7, wherein the input electric signal is a burst signal including a frequency component ranging from DC to almost a hit rate of the burst.

* * * * *